United States Patent
Hanna et al.

(10) Patent No.: US 7,639,840 B2
(45) Date of Patent: Dec. 29, 2009

(54) METHOD AND APPARATUS FOR IMPROVED VIDEO SURVEILLANCE THROUGH CLASSIFICATION OF DETECTED OBJECTS

(75) Inventors: Keith Hanna, Princeton Junction, NJ (US); Manoj Aggarwal, Lawrenceville, NJ (US); Harpreet Sawhney, West Windsor, NJ (US); Rakesh Kumar, Monmouth Junction, NJ (US)

(73) Assignee: Sarnoff Corporation, Princeton, NJ (US)

( * ) Notice: Subject to any disclaimer, the term of this patent is extended or adjusted under 35 U.S.C. 154(b) by 889 days.

(21) Appl. No.: 11/192,484

(22) Filed: Jul. 28, 2005

(65) Prior Publication Data
US 2006/0045354 A1    Mar. 2, 2006

Related U.S. Application Data

(63) Continuation-in-part of application No. 11/141,811, filed on Jun. 1, 2005.

(60) Provisional application No. 60/592,209, filed on Jul. 28, 2004.

(51) Int. Cl.
*G06K 9/00* (2006.01)
*G06K 9/62* (2006.01)

(52) U.S. Cl. .................. 382/103; 382/107; 382/224
(58) Field of Classification Search ............ 382/107, 382/224, 103
See application file for complete search history.

(56) References Cited

U.S. PATENT DOCUMENTS

| | | | | |
|---|---|---|---|---|
| 5,777,690 A * | 7/1998 | Takeda et al. | ............... | 348/699 |
| 6,049,619 A * | 4/2000 | Anandan et al. | ............ | 382/107 |
| 6,353,678 B1 * | 3/2002 | Guo et al. | ................... | 382/154 |
| 6,721,454 B1 * | 4/2004 | Qian et al. | ................... | 382/224 |
| 6,954,498 B1 * | 10/2005 | Lipton | .................... | 375/240.08 |
| 2001/0004400 A1 * | 6/2001 | Aoki et al. | .................. | 382/107 |
| 2003/0085992 A1 * | 5/2003 | Arpa et al. | ..................... | 348/47 |
| 2003/0118214 A1 * | 6/2003 | Porikli | ........................ | 382/107 |
| 2004/0119819 A1 * | 6/2004 | Aggarwal et al. | ........... | 348/143 |
| 2005/0002572 A1 * | 1/2005 | Saptharishi et al. | ......... | 382/224 |
| 2005/0104958 A1 * | 5/2005 | Egnal et al. | .................. | 348/143 |
| 2005/0249426 A1 * | 11/2005 | Badawy | ....................... | 382/241 |
| 2006/0067562 A1 * | 3/2006 | Kamath et al. | .............. | 382/103 |

OTHER PUBLICATIONS

Alan Lipton, "Local Application of Optic Flow to Analyse Rigid versus Non-Rigid Motion," ICCV Workshop on Frame-Rate Vision, Sep. 1999.*

Fujiyoshi, H. Lipton, A.J "Real-time human motion analysis by image skeletonization", Proceedings of Fourth IEEE Workshop on Applications of Computer Vision, 1998. WACV '98, pp. 15-21.*

(Continued)

*Primary Examiner*—Samir A. Ahmed
*Assistant Examiner*—Li Liu
(74) *Attorney, Agent, or Firm*—Lowenstein Sandler PC

(57) ABSTRACT

A method and apparatus for video surveillance is disclosed. In one embodiment, a sequence of scene imagery representing a field of view is received. One or more moving objects are identified within the sequence of scene imagery and then classified in accordance with one or more extracted spatio-temporal features. This classification may then be applied to determine whether the moving object and/or its behavior fits one or more known events or behaviors that are causes for alarm.

20 Claims, 5 Drawing Sheets

OTHER PUBLICATIONS

A Lipton "Moving Target Classification and Tracking from Real-time Video", Proc. of the 1998 DARPA Image Understanding Workshop (IUW'98).*

A. Selinger and L. Wixson, "Classifying Moving Objects as Rigid or Non-Rigid Without Correspondences," Proceedings of DARPA Image Understanding Workshop, 1, Nov. 1998, pp. 341-347.*

* cited by examiner

METHOD AND APPARATUS FOR IMPROVED VIDEO SURVEILLANCE THROUGH CLASSIFICATION OF DETECTED OBJECTS

CROSS-REFERENCE TO RELATED APPLICATIONS

This is application is a continuation-in-part of U.S. patent application Ser. No. 11/141,811, filed Jun. 1, 2005, now published as U.S. Patent Application Publication No. US 2007/0035622 A1, which is herein incorporated by reference in its entirety. In addition, this application claims benefit of U.S. Provisional Patent Application Ser. No. 60/592,209, filed Jul. 28, 2004, which is herein incorporated by reference in its entirety.

BACKGROUND OF THE INVENTION

The need for effective surveillance and security at airports, nuclear power plants and other secure locations is more pressing than ever. Organizations responsible for conducting such surveillance typically deploy a plurality of sensors (e.g., closed circuit television video and infrared cameras, radars, etc.) to provide physical security and wide-area awareness. For example, across the United States, an estimated nine million video security cameras are in use.

Typical vision-based surveillance systems depend on low-level video tracking as a means of alerting an operator to an event. If detected motion (e.g., as defined by flow) exceeds a predefined threshold, an alarm is generated. While such systems provide improved performance over earlier pixel-change detection systems, they still tend to exhibit a relatively high false alarm rate. The high false alarm rate is due, in part, to the fact that low-level detection and tracking algorithms do not adapt well to different imager and scene conditions (e.g., the same tracking rules apply in, say, an airport and a sea scene). In addition, the high-level analysis and rule-based systems that post-process the tracking data for decision making (alarm generation) are typically simplistic and fail to reflect many real world scenarios (e.g., a person returning a few feet through an airport exit to retrieve a dropped object will typically trigger an alarm even if the person resumes his path through the exit).

Thus, there is a need in the art for an improved method and apparatus for video surveillance.

SUMMARY OF THE INVENTION

A method and apparatus for video surveillance is disclosed. In one embodiment, a sequence of scene imagery representing a field of view is received. One or more moving objects are identified within the sequence of scene imagery and then classified in accordance with one or more extracted spatio-temporal features. This classification may then be applied to determine whether the moving object and/or its behavior fits one or more known events or behaviors that are causes for alarm.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention discloses a method and apparatus for providing improved surveillance and motion detection by defining a moving object according to a plurality of feature vectors, rather than according to just a single feature vector. The plurality of feature vectors provides a richer set of information upon which to analyze and characterize detected motion, thereby improving the accuracy of surveillance methods and substantially reducing false alarm rates (e.g., triggered by environmental movement such as swaying trees, wind, etc. and other normal, real world events for which existing surveillance systems do not account). Moreover, the plurality of feature vectors enables rapid, accurate classification of the associated objects into one or more known object classes (e.g., humans, animals, vehicles, etc.).

Figure 1:
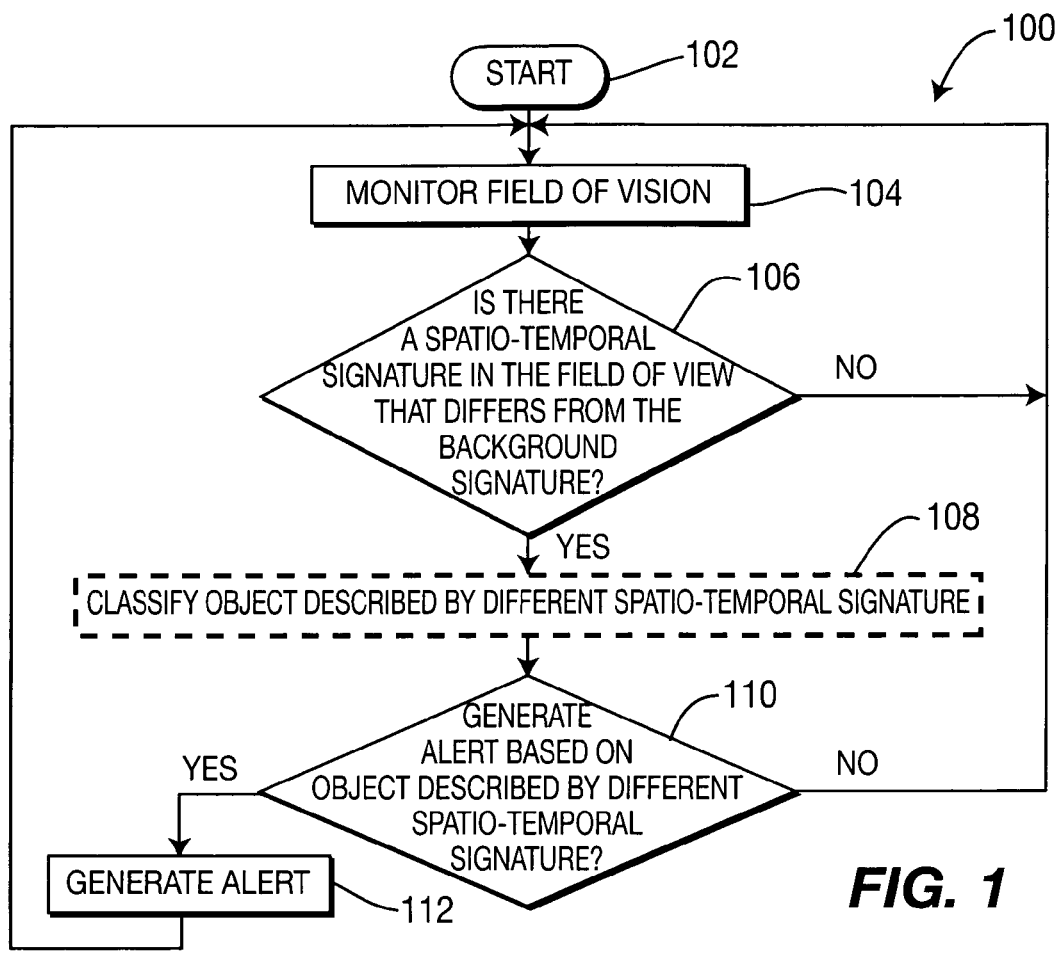
FIG. 1 is a flow diagram illustrating one embodiment of a method for video surveillance, according to the present invention.

FIG. 1 is a flow diagram illustrating one embodiment of a method 100 for video surveillance, according to the present invention. The method 100 may be implemented, for example, in a surveillance system that includes one or more image capturing devices (e.g., video cameras) positioned to monitor a field of view. For example, one embodiment of a motion detection and tracking system that may be advantageously adapted to benefit from the present invention is described in U.S. Pat. No. 6,303,920, issued Oct. 16, 2001.

The method 100 is initialized in step 102 and proceeds to step 104, where the method 100 monitors the field of view (e.g., at least a portion of the area under surveillance). In step 106, the method 100 detects an object (e.g., a person, an animal, a vehicle, etc.) moving within the field of view. Specifically, the method 100 detects the moving object by determining whether a spatio-temporal signature of an object moving in the field of view differs from the spatio-temporal signatures associated with the background (e.g., due to movement in the background such as swaying trees or weather conditions), or does not "fit" one or more spatio-temporal signatures that are expected to be observed within the background. In one embodiment, an object's spatio-temporal signature comprises a set (e.g., a plurality) of feature vectors that describe the object and its motion over a space-time interval.

The feature vectors describing a background scene will differ significantly from the feature vectors describing a moving object appearing in the background scene. For example, if the monitored field of view is a sea scene, the spatio-temporal signatures associated with the background might describe the flow of the water, the sway of the trees or the weather conditions (e.g., wind, rain). The spatio-temporal signature of a person walking through the sea scene might describe the person's size, his velocity, his gait or the swing of his arms. Thus, motion in the field of view may be detected by detecting the difference in the spatio-temporal signature of the person relative to the spatio-temporal signatures associated with the background. In one embodiment, the method 100 may have access to one or more stored sets of spatio-temporal features that describe particular background conditions or scenes (e.g., airport, ocean, etc.) and movement that is expected to occur therein.

Once a moving object has been detected by the method 100 (e.g., in accordance with the spatio-temporal signature differences), the method 100 optionally proceeds to step 108 and classifies the detected object based on its spatio-temporal signature. As described above, an object's spatio-temporal signature provides a rich set of information about the object and its motion. This set of information can be used to classify the object with a relatively high degree of accuracy. For example, a person walking across the field of view might have two feature vectors or signatures associated with his motion: a first given by his velocity as he walks and a second given by the motion of his limbs (e.g., gait, swinging arms) as he walks. In addition, the person's size may also be part of his spatio-temporal signature. Thus, this person's spatio-temporal signature provides a rich set of data that can be used to identify him as person rather than, for example, a dog or a car. As a further example, different vehicle types may be distinguished by their relative spatio-temporal signatures (e.g., sedans, SUVs, sports cars). In one embodiment, such classification is performed in accordance with any known classifier method.

For example, in some embodiments, object classification in accordance with optional step 108 includes comparing the detected object's spatio-temporal signature to the spatio-temporal signatures of one or more learned objects (e.g., as stored in a database). That is, by comparing the spatio-temporal signature of the detected object to the spatio-temporal signatures of known objects, the detected object may be classified according to the known object that it most closely resembles at the spatio-temporal signature level. In one embodiment, a detected object may be saved as a new learned object (e.g., if the detected object does not resemble at least one learned object within a predefined threshold of similarity) based on the detection performance of the method 100 and/or on user feedback. In another embodiment, existing learned objects may be modified based on the detection performance of the method 100 and/or on user feedback.

Thus, if the method 100 determines in step 106 that a spatio-temporal signature differing from the spatio-temporal signatures associated with the background scene is present, the method 100 determines that a moving object has been detected, proceeds (directly or indirectly via step 108) to step 110 and determines whether to generate an alert. In one embodiment, the determination of whether to generate an alert is based simply on whether a moving object has been detected (e.g., if a moving object is detected, generate an alert). In further embodiments, the alert may be generated not just on the basis of a detected moving object, but on the features of the detected moving object as described by the object's spatio-temporal signature.

In yet another embodiment, the determination of whether to generate an alert is based on a comparison of the detected object's spatio-temporal signature to one or more learned (e.g., stored) spatio-temporal signatures representing known "alarm" conditions. As discussed in further detail below with respect to FIG. 2, the method 100 may have access to a plurality of learned examples of "alarm" conditions (e.g., conditions under which an alert should be generated if matched to a detected spatio-temporal signature) and "non-alarm" conditions (e.g., conditions under which an alert should not be generated if matched to a detected spatio-temporal signature).

If the method 100 determines in step 110 that an alert should be generated, the method 100 proceeds to step 112 and generates the alert. In one embodiment, the alert is an alarm (e.g., an audio alarm, a strobe, etc.) that simply announces the presence of a moving object in the field of view or the existence of an alarm condition. In another embodiment, the alert is a control signal that instructs the motion detection system to track the detected moving object.

After generating the alert, the method 100 returns to step 104 and continues to monitor the field of view, proceeding as described above when/if other moving objects are detected. Alternatively, if the method 100 determines in step 110 that an alarm should not be generated, the method 100 returns directly to step 104.

The method 100 thereby provides improved surveillance and motion detection by defining a moving object according to a plurality of feature vectors (e.g., the spatio-temporal signature), rather than according to just a single feature vector (e.g., flow). The plurality of feature vectors that comprise the spatio-temporal signature provides a richer set of information about a detected moving object than existing algorithms that rely on a single feature vector for motion detection. For example, while an existing motion detection algorithm may be able to determine that a detected object is moving across the field of view at x pixels per second, the method 100 is capable of providing additional information about the detected object (e.g., the object moving across the field of view at x pixels per second is a person running). By focusing on the spatio-temporal signature of an object relative to one or more spatio-temporal signatures associated with the background scene in which the object is moving, false alarms for background motion such as swaying trees, flowing water and weather conditions can be substantially reduced. Moreover, as discussed, the method 100 is capable of classifying detected objects according to their spatio-temporal signatures, providing the possibility for an even higher degree of motion detection and alert generation accuracy.

Figure 2:
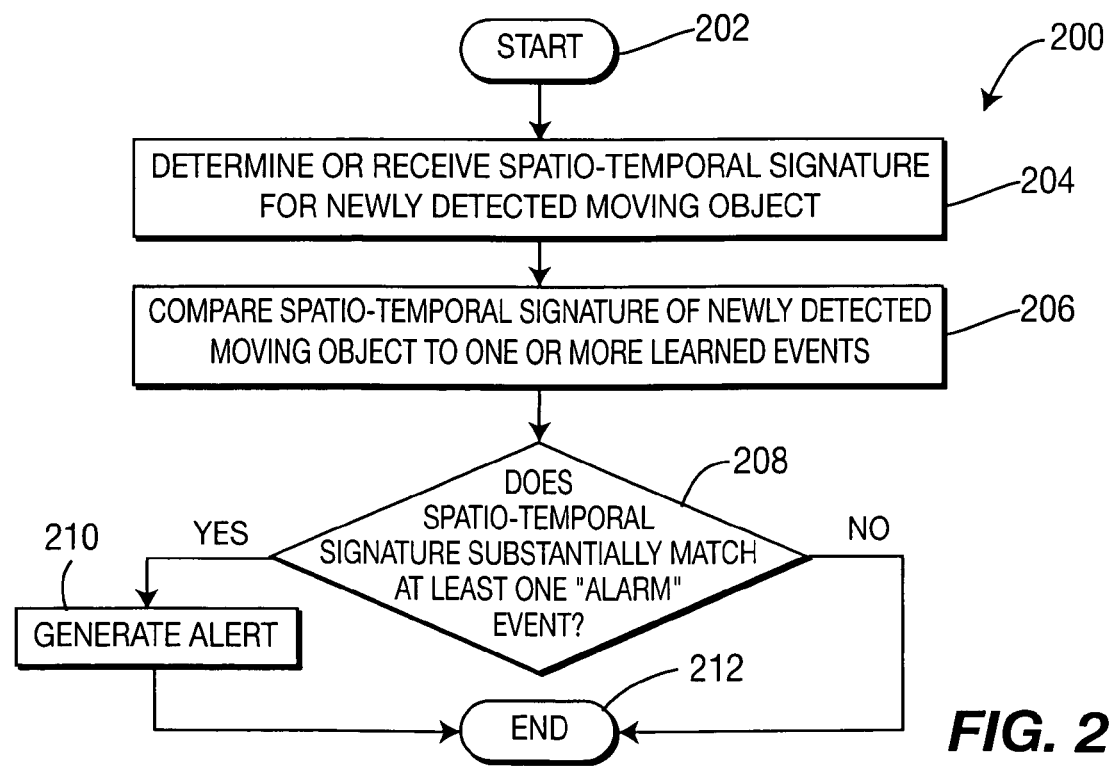
FIG. 2 is a flow diagram illustrating one embodiment of a method for determining whether to generate an alert in response to a newly detected moving object, according to the present invention.

FIG. 2 is a flow diagram illustrating one embodiment of a method 200 for determining whether to generate an alert in response to a newly detected moving object (e.g., in accordance with step 110 of the method 100), according to the present invention. Specifically, the method 200 determines whether the newly detected moving object is indicative of an alarm event or condition by comparing it to previously learned alarm and/or non-alarm events. The method 200 is initialized at step 202 and proceeds to step 204, where the method 200 determines or receives the spatio-temporal signature of a newly detected moving object. In one embodiment, the spatio-temporal signature of the newly detected moving object is extracted from a time-ordered sequence of scene imagery and a list of detected object tracks (e.g., as output from an object tracking module that tracks objects over one or more imaging sensors).

In step 206, the method 200 compares the spatio-temporal signature of the newly detected moving object to one or more learned events. In one embodiment, these learned events include at least one of known alarm events and known non-alarm events. In one embodiments, these learned events are stored (e.g., in a database) and classified, as described in further detail below with respect to FIG. 3. In one embodiment, the learned events are stored as histograms of motion-based spatio-temporal features for every pixel in an image of the learned event. Whenever activity is detected at a given pixel by one or more of the object tracks, the corresponding histogram is updated at that pixel. Assuming that most activity in the relevant sequence of scene imagery is normal, the constructed histogram represents the probability distribution of spatio-temporal features due to normal activity in the field of view.

In one embodiment, the method 200 learns alarm and non-alarm events through user definition. That is, a user may specify to the method 200 which types of events should be considered alarm events and which types of events should be considered non-alarm events. In one embodiment, the user simply indicates (e.g., via a graphical user interface) whether a displayed event or behavior should be considered an alarm event or a non-alarm event. In another embodiment, the user may describe or define characteristics of an event that should be considered an alarm event (e.g., with the aid of a higher-level programming language), such as starting and/or end locations of moving objects (e.g., including movement of objects from a first defined zone into a second defined zone), speed of moving objects, numbers of moving objects, duration of movement, associations of moving objects, time of day and the like. In yet another embodiment, alarm or non-alarm events may be specified both by selecting displayed events or behavior and by further providing supplemental circumstantial data (e.g., to define threat levels or qualifying information). User definitions may then be translated into low-level mathematical definitions (e.g., of object paths) for use by the method 200.

In step 208, the method 200 determines whether the spatio-temporal signature of the newly detected moving object substantially matches (e.g., resembles within a predefined threshold of similarity) or fits the criteria of at least one learned alarm event. If the method 200 determines that the spatio-temporal signature of the newly detected moving object does substantially match at least one learned alarm event, the method 200 proceeds to step 210 and generates an alert (e.g., as discussed above with respect to FIG. 1). In one embodiment, the spatio-temporal signature of the newly detected moving object is compared to a learned alarm event in accordance with object point and track statistics. An object's track statistics represent the object's path of motion, and may include the path's starting point, the path's end point, the path's length and the path's temporal duration. An object's point statistics represent changes in activity at discrete points along the object's path of motion.

Given a newly detected moving object's track statistics, the current spatio-temporal features along the corresponding path of motion are compared with the spatio-temporal point histograms learned at points along the tracks. In one embodiment, the feature probabilities at all points along an object's track are combined to generate an overall track probability. The track probability is then further combined with a probability produced by comparing the current track statistics with the overall track statistics for a learned alarm event. A threshold may be applied to this combined probability to distinguish between normal and abnormal activity.

The method 200 then terminates in step 212. Alternatively, if the method 200 determines in step 208 that the spatio-temporal signature of the newly detected moving object does not substantially match at least one learned alarm event, the method 200 proceeds directly to step 212.

Figure 3:
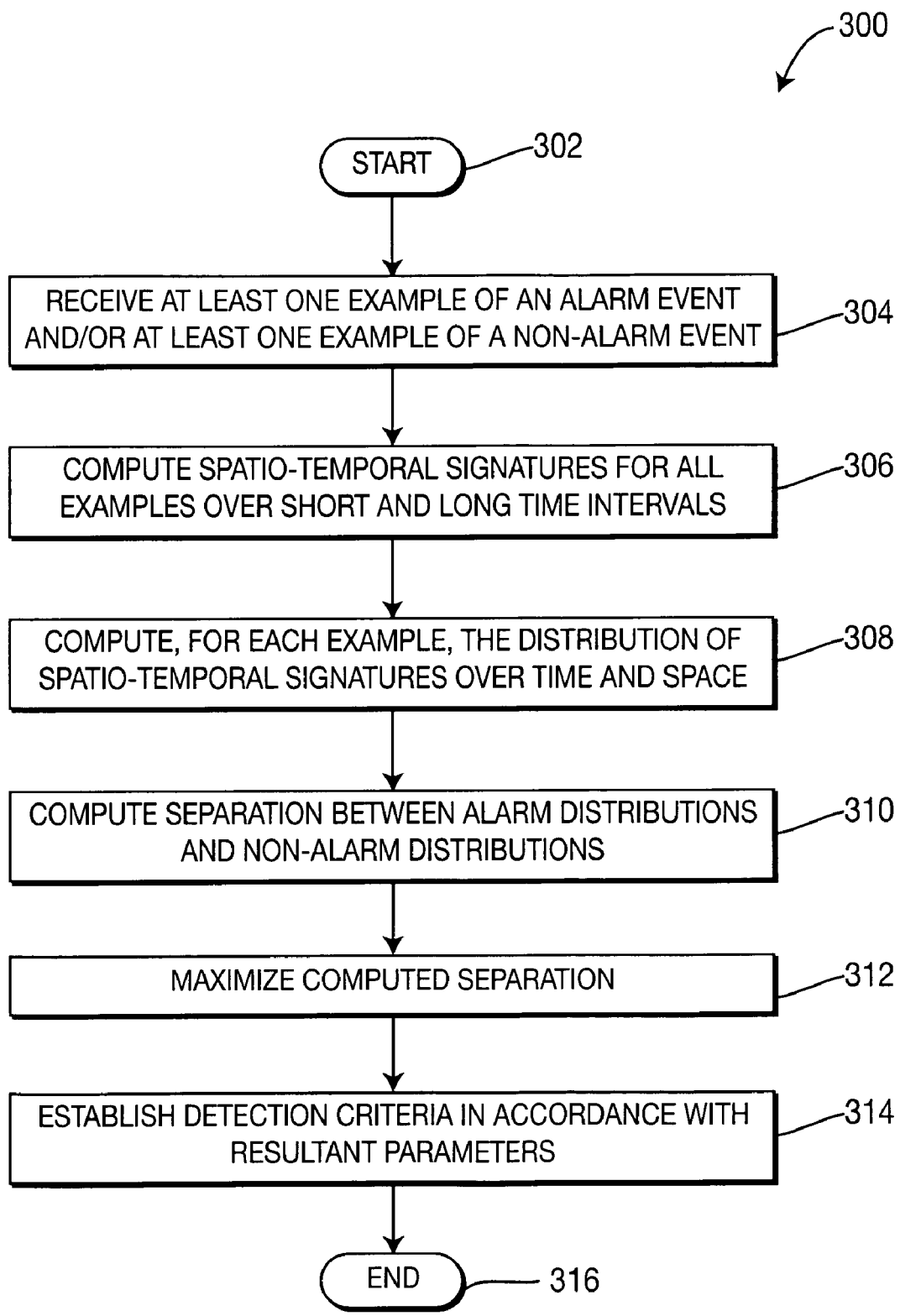
FIG. 3 is a flow diagram illustrating one embodiment of a method for learning alarm events, according to the present invention.

FIG. 3 is a flow diagram illustrating one embodiment of a method 300 for learning alarm events (e.g., for use in accordance with the method 200), according to the present invention. The method 300 is initialized at step 302 and proceeds to step 304, where the method 300 receives or retrieves at least one example (e.g., comprising video footage) of an exemplary alarm event or condition and/or at least one example of an exemplary non-alarm event or condition. For example, the example of the alarm event might comprise footage of an individual running at high speed through an airport security checkpoint, while the example of the non-alarm event might comprise footage of people proceeding through the security checkpoint in an orderly fashion.

In step 306, the method 300 computes, for each example (alarm and non-alarm) received in step 304, the spatio-temporal signatures of moving objects detected therein over both long and short time intervals (e.g., where the intervals are "long" or "short" relative to each other). In one embodiment, the core elements of the computed spatio-temporal signatures include at least one of instantaneous size, position, velocity and acceleration. In one embodiment, detection of these moving objects is performed in accordance with the method 100.

In step 308, the method 300 computes, for each example, the distribution of spatio-temporal signatures over time and space, thereby providing a rich set of information characterizing the activity occurring in the associated example. In one embodiment, the distributions of the spatio-temporal signatures are computed in accordance with methods similar to the textural analysis of image features.

In step 310, the method 300 computes the separation between the distributions calculated for alarm events and the distributions calculated for non-alarm conditions. In one embodiment, the separation is computed dynamically and automatically, thereby accounting for environmental changes in a monitored field of view or camera changes over time. In further embodiments, a user may provide feedback to the method 300 defining true and false alarm events, so that the method 300 may learn not to repeat false alarm detections.

Once the distribution separation has been computed, the method 300 proceeds to step 312 and maximizes this separation. In one embodiment, the maximization is performed in accordance with standard methods such as Fisher's linear discriminant.

In step 314, the method 300 establishes detection criteria (e.g., for detecting alarm conditions) in accordance with one or more parameters that are the result of the separation maximization. In one embodiment, establishment of detection criteria further includes grouping similar learned examples of alarm and non-alarm events into classes of events (e.g., agitated people vs. non-agitated people). In one embodiment, event classification can be performed in accordance with at least one of manual and automatic processing. In further embodiments, establishment of detection criteria further includes defining one or more supplemental rules that describe when an event or class of events should be enabled or disabled as an alarm event. For example, the definition of an alarm condition may vary depending on a current threat level, the time of day and other factors (e.g., the agitated motion of a person might be considered an alarm condition when the threat level is high, but a non-alarm condition when the threat level is low). Thus, the supplemental rules are not based on specific criteria (e.g., direction of motion), but on the classes of alarm and non-alarm events.

Figure 4:
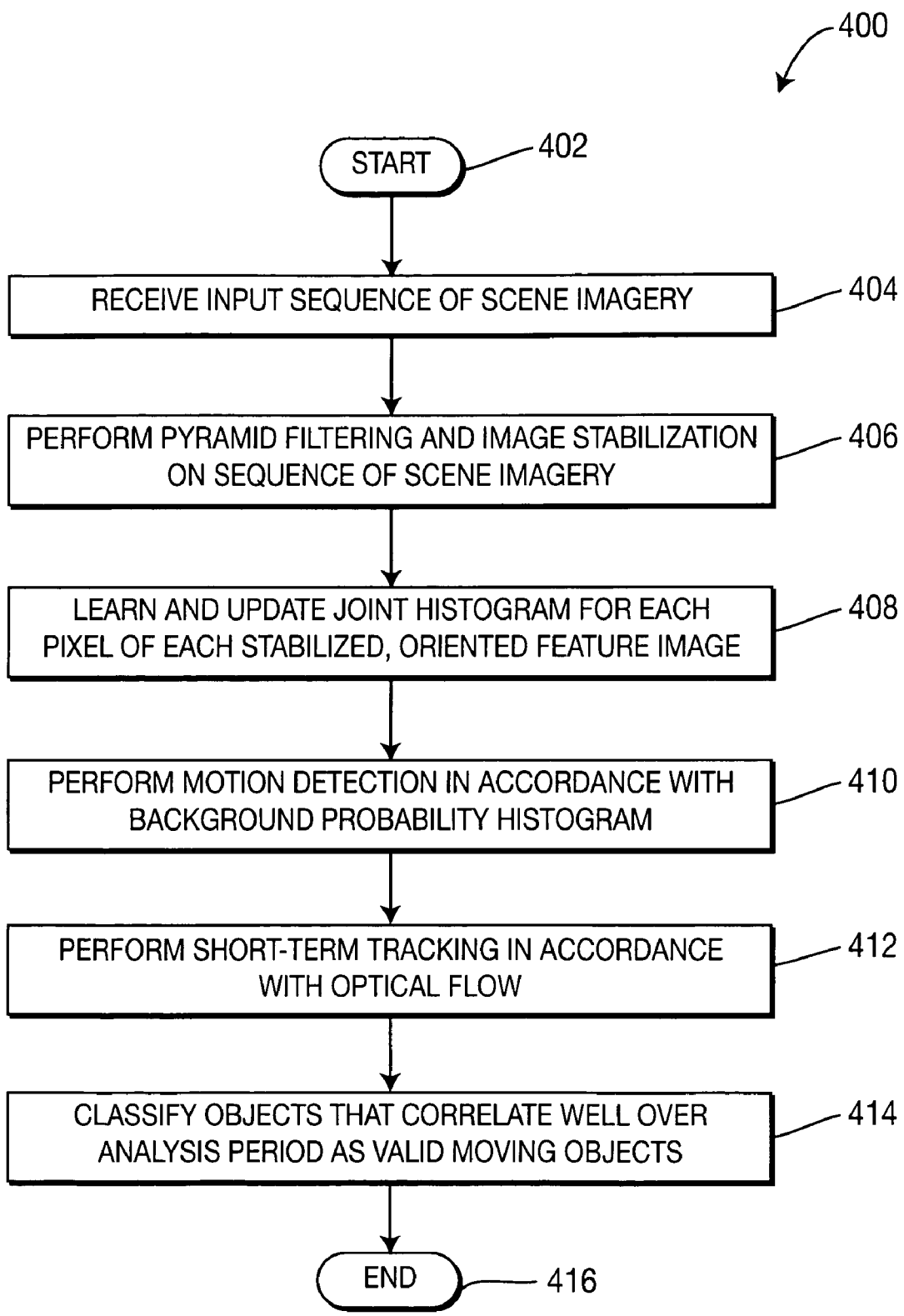
FIG. 4 is a flow diagram illustrating one embodiment of a method for identifying moving objects whose spatio-temporal signatures differ from background signatures, according to the present invention.

FIG. 4 is a flow diagram illustrating one embodiment of a method 400 for identifying moving objects whose spatio-temporal signatures differ from background signatures, according to the present invention. The method 400 may be implemented, for example, in accordance with step 106 of the method 100.

The method 400 is initialized at step 402 and proceeds to step 404, where the method 404 receives (e.g., from a video camera or other imaging sensor) a sequence of scene imagery representing the monitored field of view.

In step 406, the method 400 performs pyramid filtering and image stabilization on the sequence of scene imagery, in order to provide robustness to illumination variations in the field of view, motion of the imaging sensor that provided the sequence of scene imagery and variations in object speed and size in the field of view. The output of step 406 comprises a plurality of stabilized feature images, where the plurality of feature images represents the original sequence of scene imagery decomposed into different scales and orientations.

In step 408, the method 400 learns and updates joint histograms for each pixel of each stabilized, oriented feature image produced in step 406. In this manner, the background of the sequence of scene imagery may be modeled as a background probability histogram. In one embodiment, step 408 comprises feeding each stabilized, oriented feature image into a multi-feature background modeling module. The complexity of a given background probability histogram will depend on the number of features and joint statistics to be accounted for. For example, if the features depicted in the feature images are statistically independent, a joint multidimensional histogram is substantially equivalent to a plurality of single-feature histograms. In one embodiment, the method 400 applies one or more spatio-temporal filters to the image features in order to facilitate statistical independence among the features, thereby minimizing feature dependence and reducing the complexity of the background probability histogram.

In one embodiment, the method 400 updates the background probability histogram in real time (e.g., substantially continuously) in order to adapt the performance of the video surveillance method to changing statistics (e.g., as day progresses into night). In one embodiment, the background probability histogram comprises multiple background probability histograms computed along single cross sections of the sequence of scene imagery, so that the results may be presented in two-dimensional images.

Figure 5:
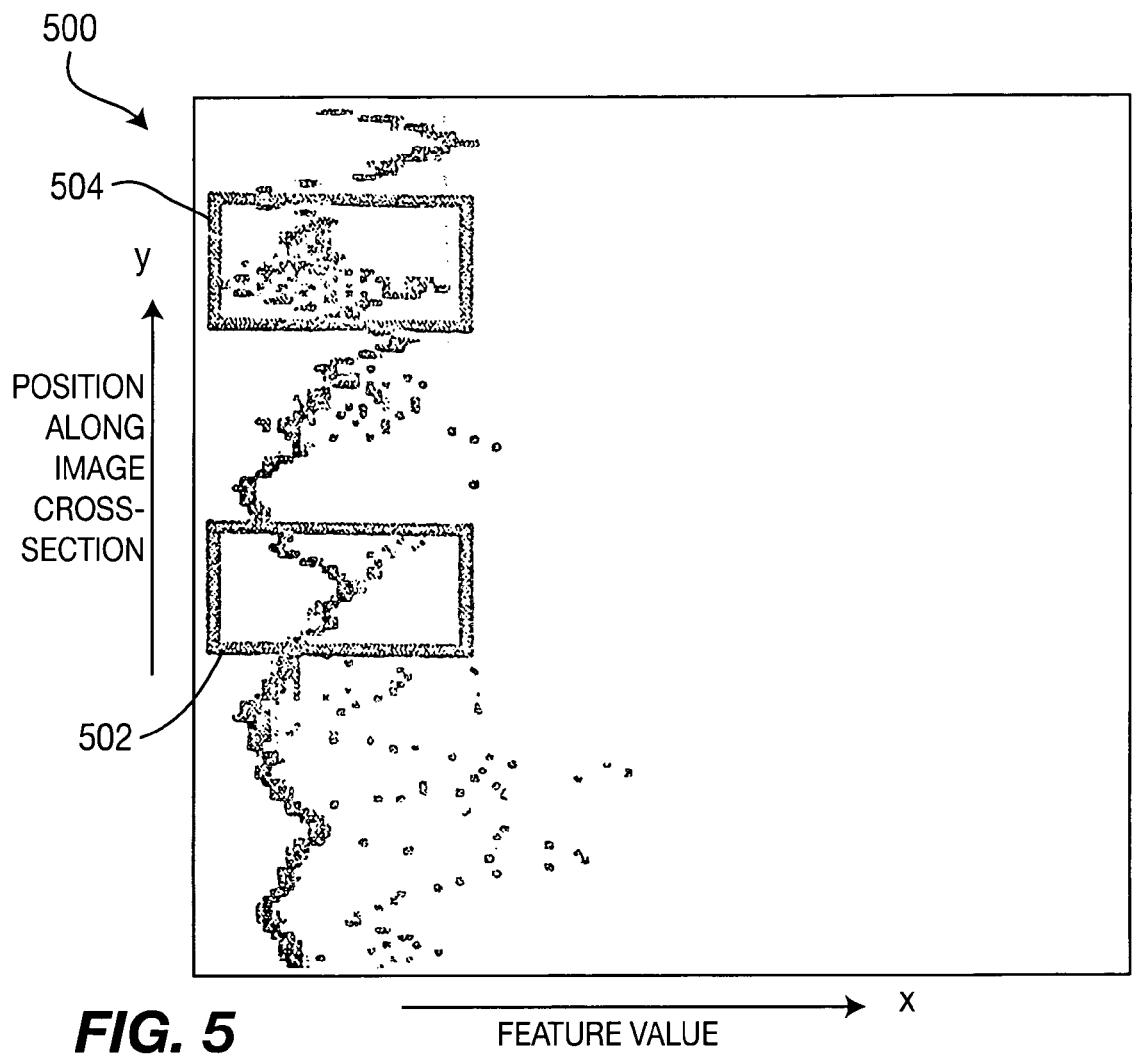
FIG. 5 illustrates an exemplary background probability histogram for a given feature over a sequence of scene imagery.

FIG. 5 illustrates an exemplary background probability histogram 500 for a given feature over a sequence of scene imagery. As illustrated, the y axis represents the position of the cross section of the sequence of scene imagery; the x axis represents the histogram of the computed value for the feature relative at the corresponding position of the cross section. For example, along any line parallel to the x axis, dark or blackened areas indicate feature values that rarely or never occur over the sequence of scene imagery at the illustrated location, while bright or white areas indicate feature values that occur more frequently at the illustrated location. The area contained within the box 502 depicts an image region in which feature values are relatively stable over the sequence of scene imagery (as shown by the largely unimodal histogram distributions moving from left to right in the box 502. By contrast, the area contained within the box 504 depicts an image region in which the feature values vary widely over the sequence of scene imagery.

Referring back to FIG. 4, once the background probability histogram has been learned and appropriately updated, the method 400 proceeds to step 410 and performs motion detection in accordance with the background probability histogram. In particular, the method 400 compares the outputs of the background probability histogram at each point to the current sequence of scene imagery. That is, the spatio-temporal signatures computed at each image point from a current time instant are compared to the background probability histogram. If the computed likelihood probability is below a given threshold, the point in question is considered to belong to a foreground object (e.g., the point is not part of the background).

In step 412, the method 400 performs short-term tracking of foreground objects (e.g., as identified in step 410) in accordance with optical flow. Specifically, the method 400 correlates instantaneous object detections across an analysis period (i.e., a short period of time). The length of the analysis period is adjustable and in one embodiment is chosen based on the object(s) to be tracked. For example, the analysis period for a very fast-moving object may be much shorter than the analysis period for a very slow moving object (e.g., approximately half a second versus approximately ten to fifteen seconds). In one embodiment, the analysis period is on the order of a couple of seconds depending upon the application.

In step 414, the method 400 classifies detected objects that correlate well over the analysis period as "valid" objects (e.g., moving objects that are not part of the background); detected objects that do not correlate well are in one embodiment disregarded. In one embodiment, detected objects are considered to correlate well if the detected objects can be reliably tracked over a given analysis period using optical flow analysis, such that changes in the detected objects over time can be observed. Thus, step 414 provides a degree of resilience against sudden, non-salient environmental changes in the sequence of scene imagery.

The method 400 terminates in step 414. The output of the method 400 (e.g., detected moving objects) may be provided to step 108 and/or step 110 of the method 100 for classification of the output and/or a determination as to how to respond to the output from an alert standpoint.

Figure 6:
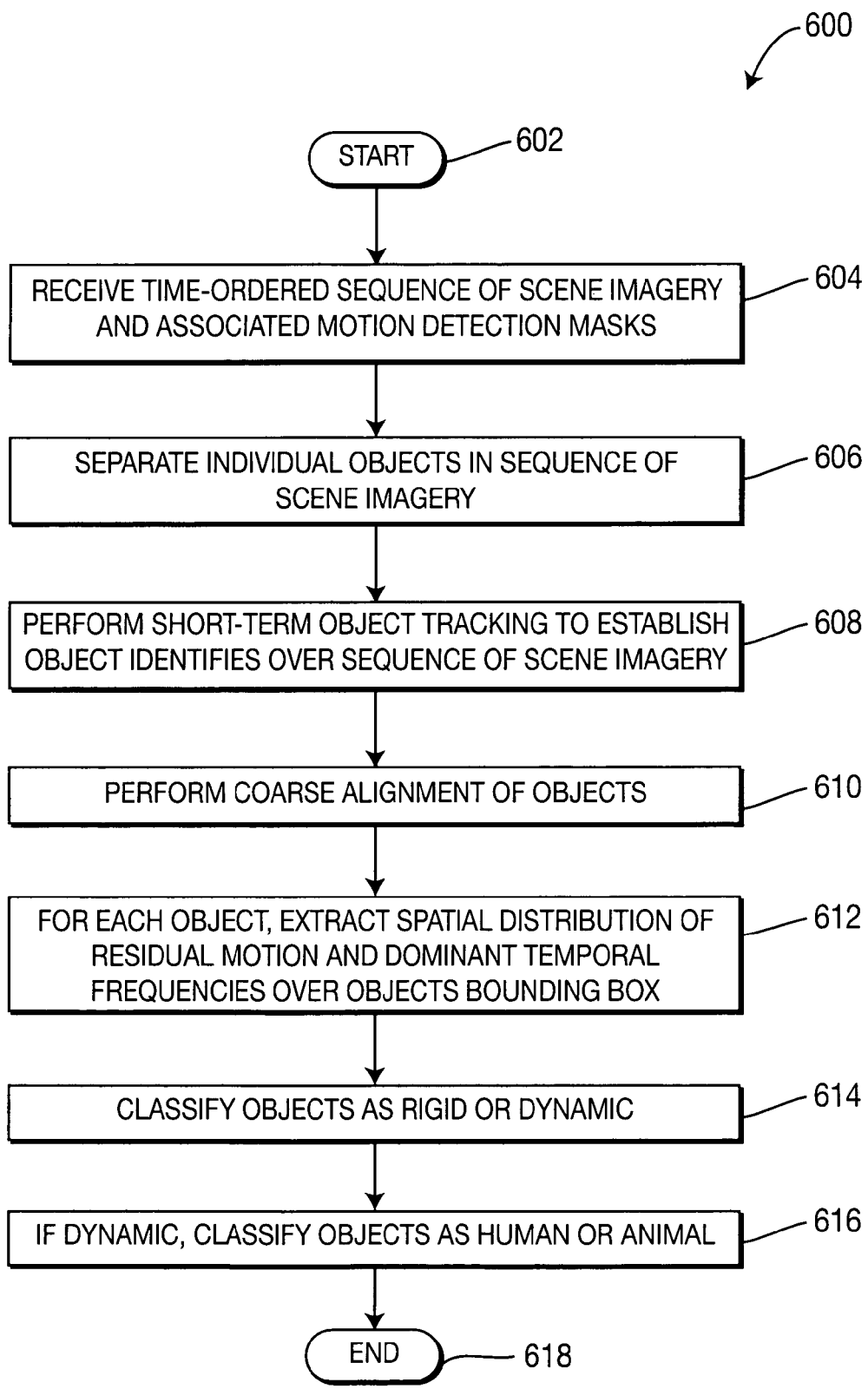
FIG. 6 is a flow diagram illustrating one embodiment of a method for classifying detected objects, according to the present invention.

FIG. 6 is a flow diagram illustrating one embodiment of a method 600 for classifying detected objects, according to the present invention. The method 600 may be implemented, for example, in accordance with step 108 of the method 100.

The method 600 is initialized at step 602 and proceeds to step 604, where the method 600 receives a time-ordered sequence of scene imagery and associated motion detection masks (e.g., output from the method 400).

In step 606, the method 600 separates individual objects in the sequence of scene imagery. In one embodiment, this is accomplished by pre-processing the motion detection masks in accordance with a connected component analysis.

Once individual objects have been distinguished and separated, the method 400 proceeds to step 608 and performs short-term object tracking for the individual objects, in order to establish object identities over the sequence of scene imagery. In one embodiment, object identities are established in accordance with optical flow analysis.

In step 610, the method 600 performs a coarse alignment for the established objects. In one embodiment, coarse alignment involves tracking the established objects with a coarse-to-fine optical flow methodology in order to remove coarse displacement and scale change over at least a portion of the sequence of scene imagery. This will facilitate analysis and classification with residual arm and leg movement (e.g., where one or more of the established objects are humans).

In step 612, the method 600 extracts, for each established object, the spatial distribution of residual motion and the dominant temporal frequencies over the object's bounding box. That is, the method 600 performs spatio-temporal feature extraction in accordance with a sequence of aligned bounding boxes that correspond to an object to be classified.

The spatial distribution of residual motion (e.g., residual arm and leg motion) and the motions' temporal frequencies can provide unique characteristics of human motion versus animal motion versus rigid object (e.g., vehicle) motion. For example, the residual motion of a vehicle, which is a rigid object, is expected to be approximately zero, with little or no dominant temporal frequencies. By contrast, a human walking sideways is associated with two motion clusters: a first motion cluster for the human's legs and a second motion cluster for the human's arms. By further contrast, an animal has two motion clusters (one each for each pair of legs) that are situated along an axis parallel to the direction of motion.

Spatio-temporal feature extraction in accordance with step 612 thus produces, for each established object, a feature/activity image that is substantially equal in size to the corresponding object's bounding box. Each pixel of this feature/activity image provides temporal motion amplitude and frequency at various spatial scales for that pixel.

In step 614, the method 600 performs a first stage of object classification. That is, the method 600 classifies an established object, based on its associated feature/activity image, as either a rigid object (e.g., a vehicle) or a dynamic object (e.g., a human or an animal).

In step 616, if the method 600 has classified the established object as a dynamic object, the method 600 proceeds to a second stage of object classification, and classifies the object, based on its associated feature/activity image (e.g., spatio-temporal signature), as either a human or an animal. In one embodiment, the classification stages (e.g., steps 614 and 616) are performed using a cascade of two two-class support vector machine (SVM) classifiers. In one embodiment, the SVM classifiers are independently trained using several instances of vehicle, human and animal motion.

The method 600 terminates in step 618. The output of the method 600 is thus a set of established objects, each associated with a tag that identifies the object's class.

Figure 7:
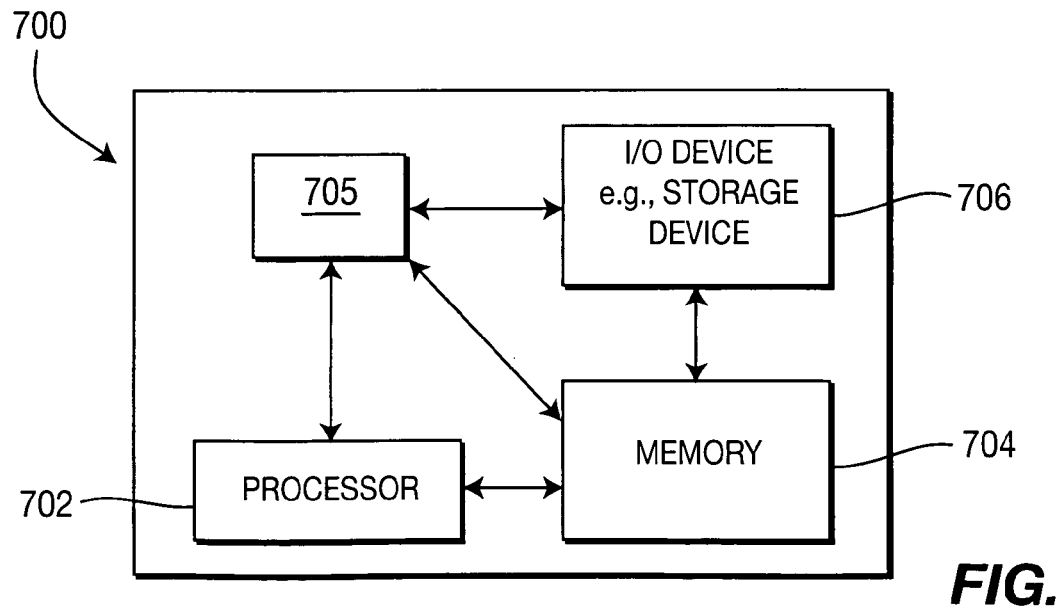
FIG. 7 is a high level block diagram of the surveillance method that is implemented using a general purpose computing device.

FIG. 7 is a high level block diagram of the surveillance method that is implemented using a general purpose computing device 700. In one embodiment, a general purpose computing device 700 comprises a processor 702, a memory 704, a surveillance module 705 and various input/output (I/O) devices 706 such as a display, a keyboard, a mouse, a modem, and the like. In one embodiment, at least one I/O device is a storage device (e.g., a disk drive, an optical disk drive, a floppy disk drive). It should be understood that the surveillance module 705 can be implemented as a physical device or subsystem that is coupled to a processor through a communication channel.

Alternatively, the surveillance module 705 can be represented by one or more software applications (or even a combination of software and hardware, e.g., using Application Specific Integrated Circuits (ASIC)), where the software is loaded from a storage medium (e.g., I/O devices 706) and operated by the processor 702 in the memory 704 of the general purpose computing device 700. Thus, in one embodiment, the surveillance module 705 for performing surveillance in secure locations described herein with reference to the preceding Figures can be stored on a computer readable medium or carrier (e.g., RAM, magnetic or optical drive or diskette, and the like).

Thus, the present invention represents a significant advancement in the field of video surveillance and motion detection. A method and apparatus are provided that enable improved surveillance and motion detection by defining a moving object according to a plurality of feature vectors (e.g., the spatio-temporal signature), rather than according to just a single feature vector (e.g., flow). By focusing on the spatio-temporal signature of an object relative to a spatio-temporal signature of the background scene in which the object is moving, false alarms for background motion such as swaying trees, flowing water and weather conditions can be substantially reduced. Moreover, the method and apparatus are capable of classifying detected objects according to their spatio-temporal signatures, providing the possibility for an even higher degree of accuracy.

While the foregoing is directed to embodiments of the present invention, other and further embodiments of the invention may be devised without departing from the basic scope thereof, and the scope thereof is determined by the claims that follow.

The invention claimed is:

1. A computer-implemented method for classifying a moving object in a field of view, comprising:
using a processor to perform the steps of:
receiving a sequence of scene imagery representing said field of view from at least one image capturing device;
identifying said moving object in said sequence of scene imagery;
classifying said moving object in accordance with one or more extracted spatio-temporal features of said moving object, said classifying including comparing the moving object's spatio-temporal features to the spatio-temporal features of one or more learned objects; and
generating an alert in response to a newly detected moving object by comparing the extracted spatio-temporal features to one or more learned events, the learned events being stored as histograms of motion-based spatio-temporal features for every pixel in an image of the learned event, the histograms representing the probability distribution of spatio-temporal features due to normal activity in the field of view.

2. The method of claim 1, wherein said receiving further comprises receiving one or more motion detection masks associated with said moving object.

3. The method of claim 1, wherein said identifying comprises:
separating said moving object from one or more other moving objects in said sequence of scene imagery; and
performing short-term object tracking for said moving object.

4. The method of claim 3, wherein said separating comprises: processing one or more motion detection masks associated with said moving object in accordance with a connected component analysis.

5. The method of claim 3, wherein said performing comprises: tracking said moving object over two or more frames of said sequence of scene imagery in accordance with optical flow analysis.

6. The method of claim 1, wherein said classifying comprises:
extracting a spatial distribution of said moving object's residual motion over a bounding box of said moving object;
extracting one or more dominant temporal frequencies of said moving object over said bounding box; and
producing, in accordance with said spatial distribution and said one or more dominant temporal frequencies, a feature/activity image for said moving object.

7. The method of claim 6, wherein said feature/activity image is substantially equal in size to said bounding box.

8. The method of claim 6, wherein said feature/activity image comprises a plurality of pixels, each of said plurality of pixels providing a respective temporal motion amplitude and a respective frequency at a plurality of spatial scales.

9. The method of claim 6, further comprising: performing a first classification stage in which said moving object is classified, based on said feature/activity image, as a either a rigid object or a dynamic object.

10. The method of claim 9, further comprising: performing a second classification stage in which said moving object is classified, based on said feature/activity image, as either a human or an animal, if said moving object is determined to be a dynamic object in said first classification stage.

11. The method of claim 10, wherein said first classification stage and said second classification stage are performed in accordance with a cascade of two two-class support vector machine classifiers.

12. The method of claim 1, further comprising: analyzing said classified moving object to determine whether behavior of said moving object should trigger an alarm.

13. A computer-readable medium having stored thereon a plurality of instructions, the plurality of instructions including instructions which, when executed by a processor, cause the processor to perform the steps of a method for classifying a moving object in a field of view, comprising:
  receiving a sequence of scene imagery representing said field of view;
  identifying said moving object in said sequence of scene imagery;
  classifying said moving object in accordance with one or more extracted spatio-temporal features of said moving object, said classifying including comparing the moving object's spatio-temporal features to the spatio-temporal features of one or more learned objects; and
  generating an alert in response to a newly detected moving object by comparing the extracted spatio-temporal features to one or more learned events, the learned events being stored as histograms of motion-based spatio-temporal features for every pixel in an image of the learned event, the histograms representing the probability distribution of spatio-temporal features due to normal activity in the field of view.

14. The computer-readable medium of claim 13, wherein said identifying comprises:
  separating said moving object from one or more other moving objects in said sequence of scene imagery; and
  performing short-term object tracking for said moving object.

15. The computer-readable medium of claim 14, further comprising:
  tracking said moving object over two or more frames of said sequence of scene imagery in accordance with optical flow analysis.

16. The computer-readable medium of claim 13, wherein said classifying comprises:
  extracting a spatial distribution of said moving object's residual motion over a bounding box of said moving object;
  extracting one or more dominant temporal frequencies of said moving object over said bounding box; and
  producing, in accordance with said spatial distribution and said one or more dominant temporal frequencies, a feature/activity image for said moving object.

17. The computer-readable medium of claim 16, further comprising: performing a first classification stage in which said moving object is classified, based on said feature/activity image, as a either a rigid object or a dynamic object.

18. The computer-readable medium of claim 17, further comprising: performing a second classification stage in which said moving object is classified, based on said feature/activity image, as either a human or an animal, if said moving object is determined to be a dynamic object in said first classification stage.

19. The computer readable medium of claim 13, further comprising: analyzing said classified moving object to determine whether behavior of said moving object should trigger an alarm.

20. An apparatus for a moving object in a field of view, comprising:
  means for receiving a sequence of scene imagery representing said field of view;
  means for identifying said moving object in said sequence of scene imagery;
  means for classifying said moving object in accordance with one or more extracted spatio-temporal features of said moving object, said means for classifying including means for comparing the moving object's spatio-temporal features to the spatio-temporal features of one or more learned objects; and
  means for generating an alert in response to a newly detected moving object by comparing the extracted spatio-temporal features to one or more learned events, the learned events being stored as histograms of motion-based spatio-temporal features for every pixel in an image of the learned event, the histograms representing the probability distribution of spatio-temporal features due to normal activity in the field of view.

* * * * *